United States Patent [19]

Kudirka et al.

[11] Patent Number: 4,737,173
[45] Date of Patent: Apr. 12, 1988

[54] ROOM AIR TREATMENT SYSTEM

[75] Inventors: Paul J. Kudirka, Grand Rapids; Gregory T. Grochoski, Ada; Robert W. Hamilton, Grand Rapids, all of Mich.

[73] Assignee: Amway Corporation, Ada, Mich.

[21] Appl. No.: 881,702

[22] Filed: Jul. 3, 1986

[51] Int. Cl.[4] .................................. B01D 50/00
[52] U.S. Cl. ............................. 55/276; 55/316; 55/470; 55/471; 55/472; 55/485; 55/502; 55/507; 55/511
[58] Field of Search ............... 55/276, 316, 350, 485, 55/471–473, 502, 507, 511, 470

[56] References Cited

U.S. PATENT DOCUMENTS

| | | | |
|---|---|---|---|
| 1,288,027 | 12/1918 | Kern | 55/485 X |
| 2,884,091 | 4/1959 | Baldwin | |
| 3,127,259 | 3/1964 | Boylan | 55/511 |
| 3,177,637 | 4/1965 | Davis | 55/483 |
| 3,242,656 | 3/1966 | Murphy, Jr. | 55/500 |
| 3,299,620 | 1/1967 | Hollingworth | 55/485 X |
| 3,375,640 | 4/1968 | Pelosi, Jr. | 55/276 |
| 3,392,846 | 7/1968 | Getzin | 210/485 |
| 3,577,710 | 5/1971 | Feldman | 55/316 |
| 3,727,384 | 4/1973 | Feldman | 55/316 X |
| 3,745,750 | 7/1973 | Arff | 55/102 |
| 3,802,168 | 4/1974 | Deckas | 55/473 |
| 3,804,942 | 4/1974 | Kato et al. | 55/276 X |
| 3,812,370 | 5/1974 | LaViolette | 250/527 |
| 3,828,530 | 8/1974 | Peters | 55/473 |
| 3,861,894 | 1/1975 | Marsh | 55/316 |
| 3,925,043 | 12/1975 | Matrone et al. | 55/276 |
| 3,928,008 | 12/1975 | Petersen | 55/472 |
| 3,933,452 | 1/1976 | Rudin | 55/499 |
| 3,936,284 | 2/1976 | Mason | 55/485 X |
| 3,971,877 | 7/1976 | Lee | 55/491 X |
| 4,252,547 | 2/1981 | Johnson | 55/234 |
| 4,350,504 | 9/1982 | Diachuk | 55/217 |
| 4,629,479 | 12/1986 | Cantoni | 55/485 X |

OTHER PUBLICATIONS

1985 Teledyne Water Pik Brochure, "Instapure Air Filtration System", 1730 East Prospect Street, Fort Collins, Col. 80525.

Teledyne Water Pik Brochures, Form No. 2AF12-R35, Part No. 26925-3, 1730 E. Prospect, Fort Collins, Col. 80525.

*Primary Examiner*—Kathleen J. Prunner
*Attorney, Agent, or Firm*—Price, Heneveld, Cooper, DeWitt & Litton

[57] ABSTRACT

A room air treatment system in which air is drawn through a large particle prefilter, a first carbon filter, a second dual honeycomb matrix carbon filter in which the honeycomb cells in adjacent matrices are offset relative to one another, a blower mounted on vibration isolation mounts and is expelled by the blower into a plenum from when it exits upwardly through a fine particle HEPA filter and finally out through a final filter which is a combination fine particle filter and carbon filter. A filter change warning system is provided which includes a 3500 hour filter change indicator, an every 7000 hour filter change indictor, a back-up warning indicator, a mute button for muting the warning indicator and a recycle system for restarting the hour count.

35 Claims, 5 Drawing Sheets

ROOM AIR TREATMENT SYSTEM

BACKGROUND OF THE INVENTION

The present invention relates to room air treatment systems. Such systems typically comprise a cabinet in which are mounted a large particle prefilter, a fine filter and a fan which pulls air through the filters and blows it back into the room. Such systems are relatively inefficient, noisy and generally not effective against chemical contaminants in the air.

Some systems incorporate carbon filters in order to eliminate odorous and chemical contamination. The carbon is often bonded to some type of fibrous material.

Some systems use carbon filters in which carbon granules are contained in a honeycomb support matrix. The honeycomb matrix comprises a plurality of cells, each of which contains carbon granules. It is difficult to pack each cell full and consequently, there is an air space above the carbon. This leads to air passing over the carbon rather than through it.

One prior art system draws air into a blower through a large particle prefilter and a carbon filter, and then forces it out through a fine particle high efficiency particulate air (HEPA) filter and out into the room[1] However, as the HEPA filter accumulates aerosol particles and odor bearing entrained particles, the associated gases eventually are carried off the filter and are conveyed into the room.

[1] U.S. Pat. No. 3,812,370 to Fred G. LaViolette, issued May 21, 1974 and entitled "Low Cost Portable Room Air Cleaner."

Indeed, one serious drawback to many room air treatment system is knowing when to change the filters. Dirty filters can become breeding grounds for problems. A satisfactory control system for warning a user to change filters would be desirable.

SUMMARY OF THE INVENTION

The room air treatment system of the present invention comprises a large particle prefilter, carbon filter means, a blower, a fine filter, and a final filter comprising a combination fine filter and carbon filter, all arranged in the order indicated. Most preferably, the carbon filter means comprises at least two layers of carbon, treated differently so as to be attractive to different contaminants.

In a most preferred aspect of the invention, a carbon filter is employed having two honeycomb support matrices, each with plural carbon containing cells therein, wherein the cells in one layer are offset laterally from those in another layer so that air passing over carbon in an individual cell in one layer will pass through carbon in an individual cell in a next layer.

These and other objects, advantages and features of the invention will be more fully understood and appreciated by reference to the written specification and appended drawings.

DESCRIPTION OF THE PREFERRED EMBODIMENT

Figure 1:
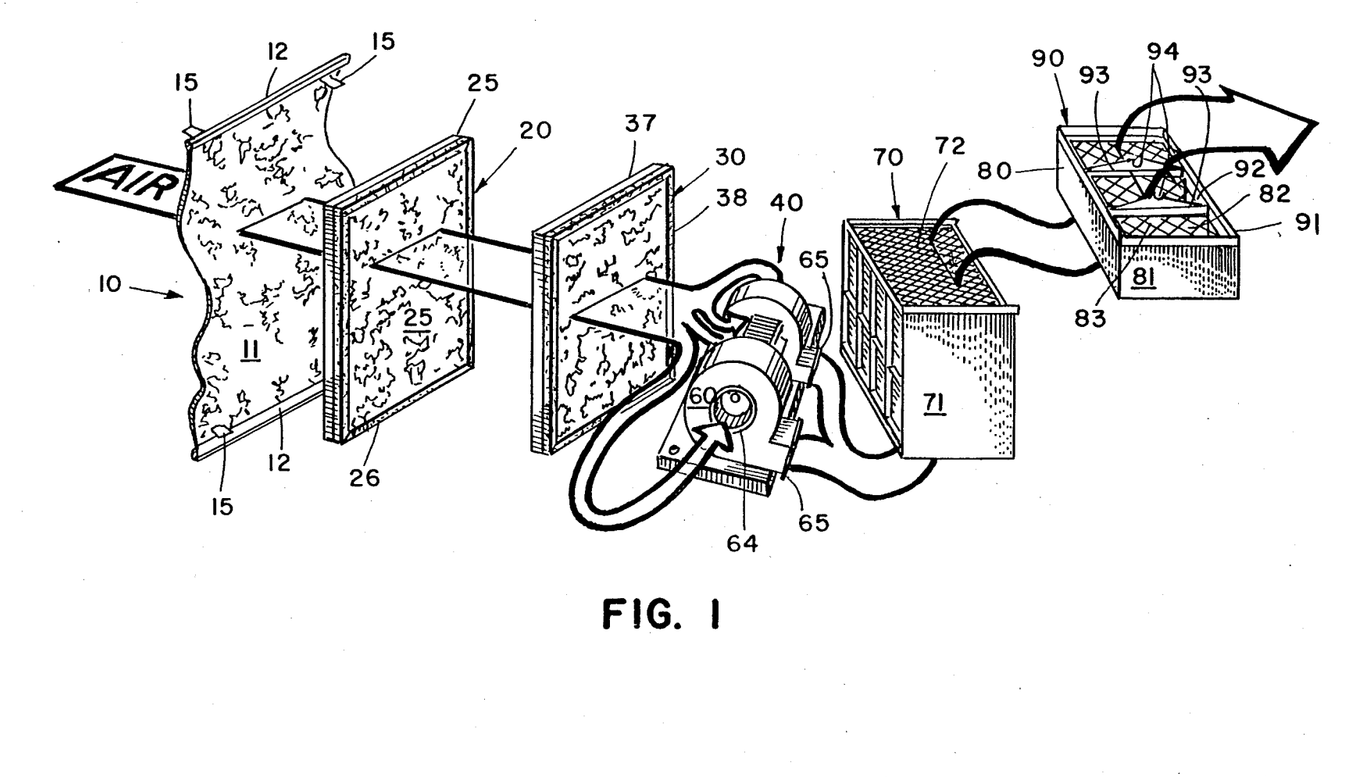
FIG. 1 is a perspective, exploded view of the various filter elements and blower assembly arranged in operational order.
Figure 2:
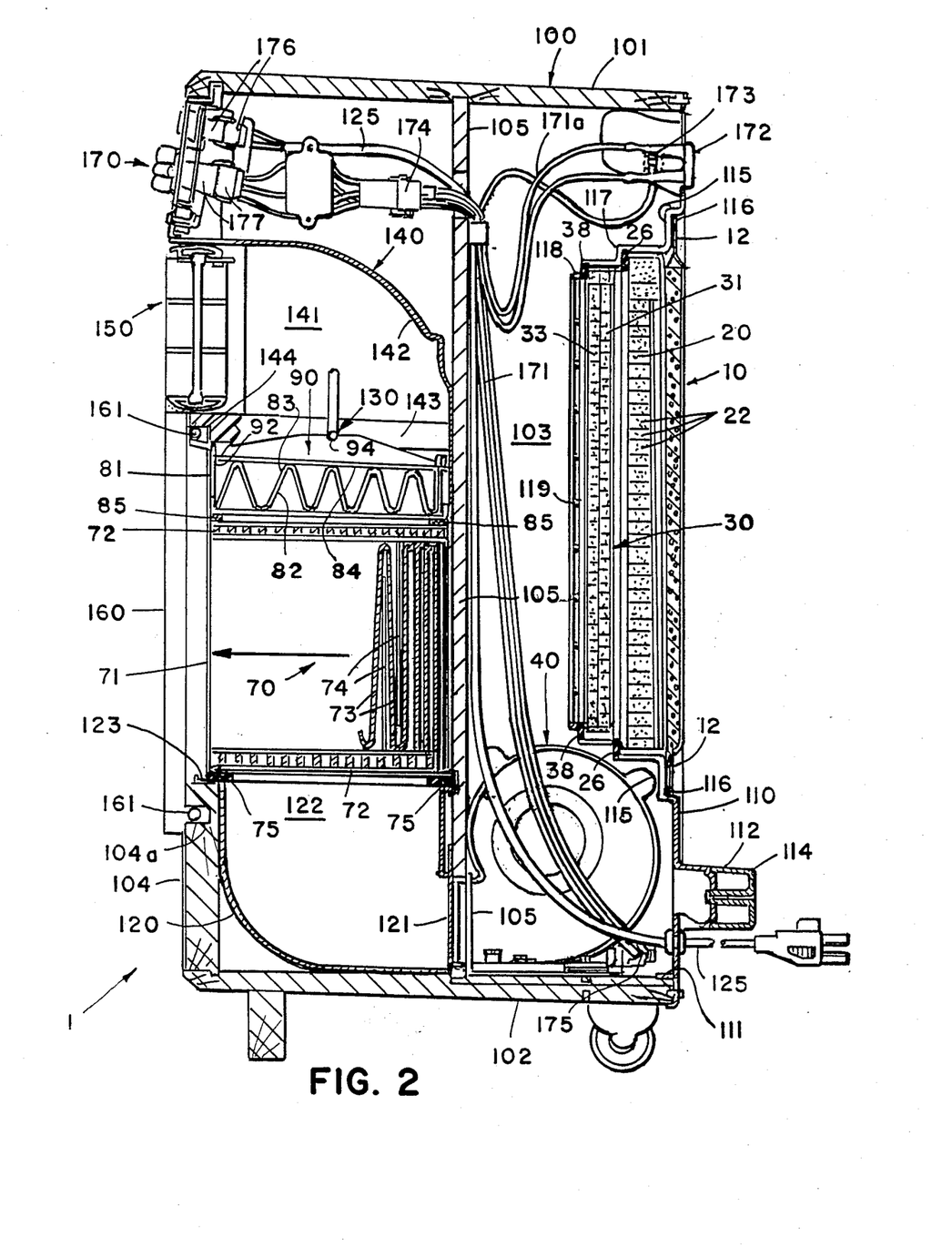
FIG. 2 is a cross-sectional view of the air treatment system of the present invention.

In the preferred embodiment, the air treatment system 1 of the present invention includes a large particle prefilter 10, a first carbon filter 20, a second carbon filter 30, a blower assembly 40, a fine particle HEPA filter 70 and a final filter 80 (FIG. 1) arranged in the indicated order in a cabinet 100 (FIG. 2). By arranging blower assembly 40 between prefilter 10 and carbon filters 20 and 30 on one side and HEPA filter 70 and final filter 80 on the other side, blower noise is muffled on both sides of blower assembly 40. Prefilter 10 removes large objects, dust, lint and the like from the air, carbon filters 20 and 30 remove chemical impurities which give rise to unpleasant odors, HEPA filter 70 removes very fine particles entrained in the air and final filter 80 comprises a combination of fibrous material and carbon to finally trap any particles and gaseous materials which have passed through the prior filters or which have for one reason or another broken free of the earlier filters after having been previously entrapped.

Large particle prefilter 10 comprises an open cell polyurethane foam sheet 11 having end securing strips 12 (FIG. 1). Foam sheet 11 comprises a material typically used in room air treatment system prefilters. It is approximately $\frac{3}{8}''$ thick and has approximately 30 pores per square inch. It is intended only to trap larger particles such as lint and larger particles of dirt and dust. It is easily removed, washed and replaced after drying.

End securing strip 12 comprises a piece of fabric tape having a plurality of looped threads 13 projecting therefrom (FIG. 3) which facilitates securing prefilter 10 in position by engagement with a mating tape having a plurality of loop engaging projections. Located at opposite ends and on opposite sides of each securing strip 12 is a pull tab 15 which a user can grasp and pull to separate securing strip 12 from its mounting strip (FIG. 1).

Figures 3, 4, 7:
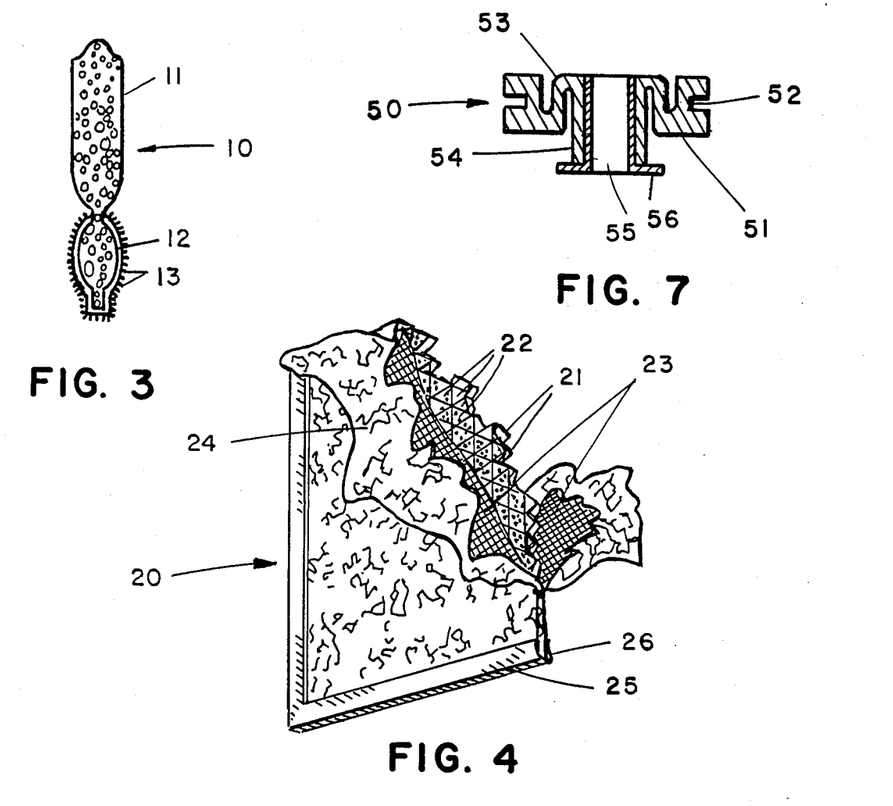
FIG. 3 is a fragmentary, cross-sectional view of the edge of the prefilter.
FIG. 4 is a broken, perspective view of the first carbon filter.
FIG. 7 is a cross-sectional view of an isolation mount used to mount the blower assembly.

First carbon filter 20 comprises an internal honeycomb support matrix 21 (FIGS. 2 and 4). Matrix 21 comprises a cross section of corrugated cardboard, approximately one inch thick, defining a plurality of individual cells 22. The individual cells can be of any configuration, but in the preferred embodiment are triangular having a height of approximately three eighths inch.

Each cell 22 of honeycomb support matrix 21 contains activated carbon. The preferred carbon blend comprises a 50/50 mixture of activated coconut shell carbon and urea impregnated activated coconut shell carbon. The untreated activated carbon acts as a general purpose absorber while the urea impregnated activated carbon is reported to preferentially remove formaldehyde and other aldehydes. The carbon particles are of a 7 by 12 US Screen mesh size, as determined by ASTM D2862.

Carbon particles are held in place within honeycomb support matrix 21 by retention screens 23 adhered to the opposite sides of honeycomb matrix 21. Each retention screen 23 is made of nylon yarn of 15 pound denier. The screen is of a sufficiently fine mesh that the carbon particles will not pass through it, while the flow of air is substantially unrestricted.

The screen covered, carbon containing honeycomb matrix 21 is encased in an outer envelope 24 comprising a dust filtering layer of white, non-woven polyester. The envelope is sealed on three sides prior to framing. The non-woven polyester material comprises 65% by weight of 6 denier fabric and 35% by weight of a suitable binder such as polyvinyl chloride. It has a density of 0.36 ounces per square foot.

The entire envelope is then contained in a 28 gauge aluminum frame 25. Frame 25 is generally U-shaped in cross section and is preferably made in one piece with mitered corners. The ends are joined with a manually operated tab fastener or the like (not shown) while the edges of the U channel are hemmed to provide additional structural strength.

Projecting from one side of frame 25 is a perimeter foam gasket 26. Foam gasket 26 is made of a relatively soft, compressible foam. It extends completely around the perimeter of one face of frame 25 so that when filter 20 is seated, its edge is sealed. The possibility of air by-passing filter 20 is minimized.

Figures 5, 6:
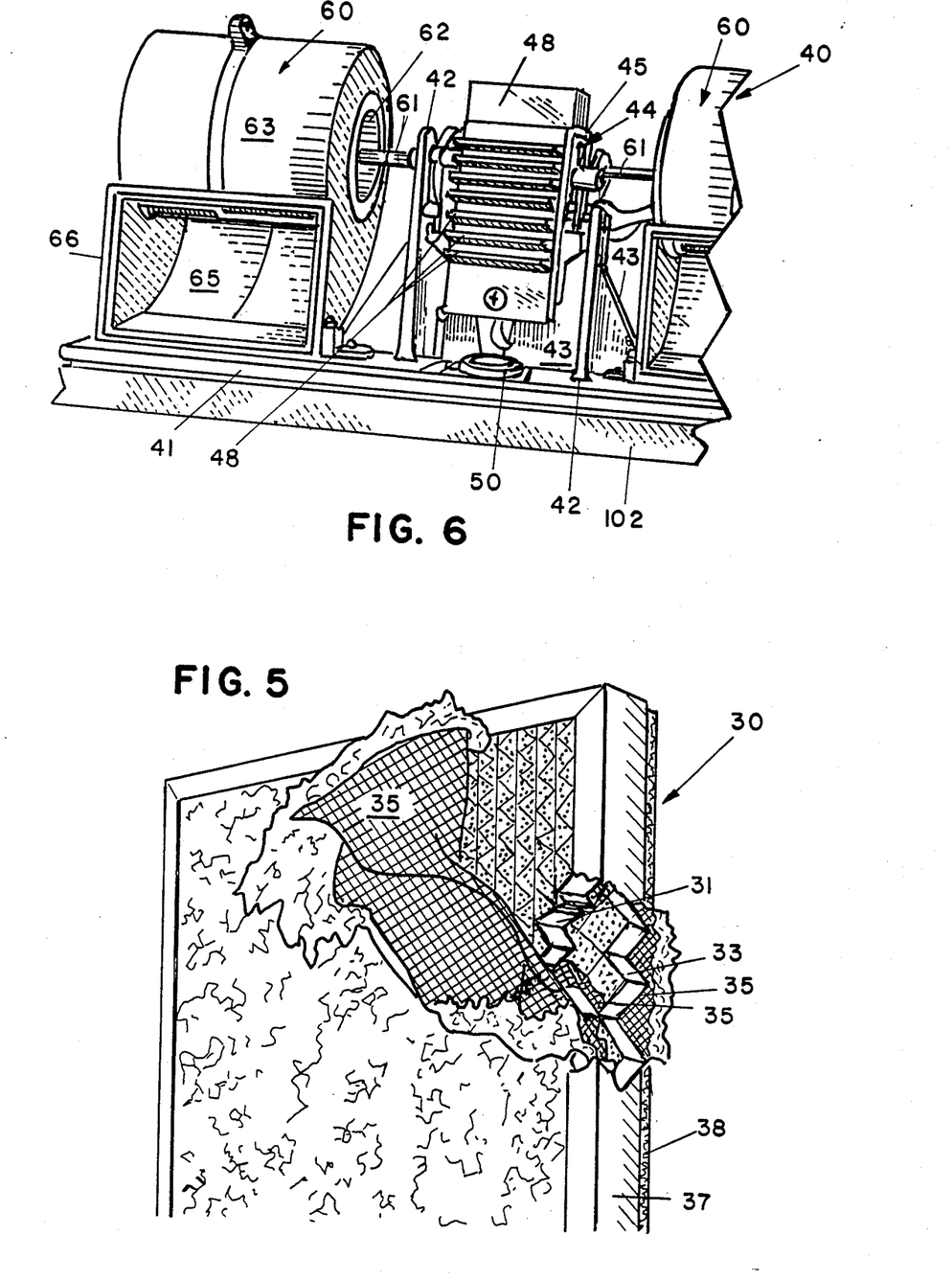
FIG. 5 is a broken, perspective view of the second carbon filter.
FIG. 6 is a broken, perspective view of the blower assembly mounted on the floor of the cabinet.

Second carbon filter 30 is similar to first carbon filter 20 but comprises first and second adjacent honeycomb support matrices 31 and 33 (FIGS. 2 and 5). Each honeycomb support matrix corresponds generally in construction to honeycomb support matrix 21, except that the sections are somewhat thinner, being approximately one half inch thick each.

First honeycomb matrix 31 contains in its cells a blend of 40% urea impregnated coconut shell activated carbon and 60% by weight non-impregnated coconut shell activated carbon. The mesh size of this blend is 7 by 12, US Screen mesh, as determined by ASTM D2862. The blend further enhances removal of aldehydes and other undesirable odors.

The activated carbon in the cells of honeycomb matrix 33 comprises a blend of 40% by weight copper oxide impregnated activated coconut shell carbon, 40% by weight potassium hydroxide impregnated activated coconut shell carbon and 20% by weight of non-impregnated activated coconut shell carbon. Again, the particle size distribution is the same as for the previously described carbon blends. The copper oxide impregnated carbon tends to remove amines and other basic gases. The potassium hydroxide impregnated activated carbon tends to remove acid gases such as sulfur dioxide. The non-impregnated carbon is, as above, a general purpose gas absorbant.

Because this combination of impregnated carbons preferentially absorbs certain contaminants it is important that it not become overloaded with other contaminants which are equally or even preferentially attracted to non-impregnated carbons or differently impregnated carbons. Hence, it is important that this layer be downstream from the non-impregnated, urea impregnated carbon combinations so that aldehydes and other general contaminants are removed prior to reaching this acid/base attractant layer.

Referring to FIG. 2, it can be seen that honeycomb matrices 31 and 33 are offset, so that their individual cells are staggered with respect to each other. This is important in that the activated carbon granules in each individual cell tend to settle to the bottom, allowing air to pass over the top of the collection of granules, rather than through them. By staggering the cells in the two different adjacent honeycomb support matrices, air passing over the activated carbon in the first layer will have to pass through the activated carbon in the second layer and vice versa. This action is further enhanced by orienting the matrices such that the rows of cells in one matrix are at right angles to the rows in the adjacent matrix (FIG. 5).

Carbon filter 30 comprises three layers of nylon retention screen 35. Each layer is as retention screen 23 described above. One layer is on the outer surface of honeycomb matrix 31, the second layer is between honeycomb matrices 31 and 33 and the other is on the outer surface of honeycomb support matrix 33. The retention screens are all bonded in place, as described above.

As with first carbon filter 20, the assembly of retention screen layers 35 and carbon containing honeycomb layers 31 and 33 are contained within a white, non-woven polyester envelope as described above. This in turn is contained within a generally U-shaped (in cross section) aluminum frame 37 which is constructed in the manner of frame 25. Finally, frame 37 is covered on one side by a perimeter foam gasket 38 which corresponds to foam gasket 26 described above.

It is important that second carbon filter 30 is just slightly smaller in rectangular dimensions than first carbon filter 20 (FIG. 2). In this way, filters 20 and 30 can be arranged adjacent one another without filter 20 sealing against the frame 37 of filter 30. Rather, the foam gasket 26 of frame 20 seals against its own, firm, sealing surface, rather than against another filter member which may have a tendency to move relative to foam gasket 26 in use.

Blower assembly 40 comprises a motor 44 with a squirrel cage fan 60 on either side thereof mounted on a molded, structural plastic platform 41 (FIG. 6). Platform 41 includes a pair of upwardly projecting motor mounting stanchions 42, reinforced by stanchion rib 43, on either side of motor 44. Motor 44 is capped by a generally U-shaped radiator 45 which includes a plurality of projecting radiator fins 48. Radiator 45 is made of aluminum or the like so as to radiate heat generated by motor 44.

Blower assembly 40 is mounted to the bottom wall 102 of cabinet 100 in spaced relationship thereto through six rubber grommets 50 which serve as vibration isolation mounts. Each grommet 50 comprises an annular rim 51 with an annular peripheral groove 52 therein and an inner cylindrical barrel 54 joined to rim 51 by means of a web 53 (FIG. 7). The foregoing are integrally molded of a vibration absorbing rubber material. Groove 52 fits over and embraces the edge of an aperture in blower assembly platform 41. A screw receiving ferrule 55 having a rim 56 fits inside cylindrical barrel 54 and receives a bolt which passes through ferrule 55 and is threaded into a T-nut embedded in bottom wall 102. Grommet 50 is oriented so that ferrule rim 56 rests on bottom wall 102 to hold platform 41 in spaced relationship with respect to bottom wall 102. As a result, vibration generated by blower assembly 40 tends to be absorbed by rubber grommet 50 before reaching bottom wall 102 of cabinet 100.

Each of the squirrel cage fans 60 is driven by a drive axle 61 extending from motor 44 (FIG. 6). Each of the squirrel cage fans comprises a vane rotor 62 located within a generally cylindrical housing 63 having an inlet 64 on each side and a tangential outlet 65. As can be seen by reference to the air flow pattern arrows in FIG. 1, air flows into each central inlet 64 on each side of each squirrel cage fan 60 and then passes out through each of the outlets 65. Each outlet 65 includes a lip on which is mounted a foam rubber gasket 66 to seal outlet 65 in position in cabinet 100 as described below and prevent air from leaking around the edges thereof. These foam gaskets also serve to minimize the transfer of vibration from blower assembly 40 to cabinet 100.

Blower assembly 40 is located upstream of HEPA filter 70 so that any carbon particles which may be carried from carbon filters 20 and 30 are trapped in HEPA filter 70. In addition, the airstream leaving blower assembly 40 is forced to undergo a 90 degree turn in plenum 120 located downstream of it in cabinet 100 (FIG. 2), thereby insuring that sharp carbon particles will not be blown directly into HEPA filter 70. Such action could conceivably damage the delicate HEPA filter media. Larger carbon particles will tend to simply settle out in plenum 120 rather than entering and clogging HEPA filter 70.

Fine particle filter 70 is a HEPA filter (FIG. 2). So called HEPA filters, high efficiency particulate air filters, are capable of removing extremely fine particles from the air. At a flow rate of about 150 cubic feet per minute, HEPA filter 70 removes between about 95 and 100% of all particles of a size of 0.1 micron or larger.

The HEPA filter is contained in a molded, structural plastic box 71 made of structural foam polystyrene or the like (FIG. 1). The top and bottom of box 71 are open, and are covered by a molded plastic grill 72 which allows air to pass therethrough (FIGS. 1 and 2). HEPA filter medium 73 is pleated with separate folds being separated by relatively thin, corrugated aluminum dividers 74. These pleats and corrugations extend across the width of box 71, though are shown broken away in FIG. 2 for convenience.

The pleats of HEPA filter medium 73 are parallel to the length of the face of box 71 and are sealed at each end by a suitable adhesive to prevent air from bypassing the HEPA medium. A soft fibrous pad (not shown) is located on the inside of each end wall of box 71 so that the side edges of the HEPA paper 73 are embedded in the soft fibrous pads, thereby minimizing air bypass around the edges of HEPA paper 73.

A peripheral gasket 75 extends around the bottom of box 71 to seal HEPA filter 70 when it is seated in cabinet 100. This minimizes air bypass around HEPA filter 70.

Final filter 80 sits on top of HEPA filter 70 and comprises a paperboard box 81 containing an activated carbon coated filter medium 82 (FIGS. 1 and 2). HEPA filter 70 is very efficient at removing liquid aerosols. Such aerosols, along with solid particles having attached odor molecules, will collect on the upstream face of the HEPA filter medium 73. In time, some of these gaseous substances will be carried through the HEPA filter by the airstream. These escaping gaseous substances are absorbed onto the carbon in final filter 80, thus preventing them from exiting air purifier 1.

The activated carbon is bonded to the non-woven medium web so that carbon particles cannot be blown into the air by air passing through final filter 80. The bulk of gaseous removal has already been accomplished by carbon filters 20 and 30 so final filter 80 is satisfactory for the above described purpose.

Carbon-bonded filter medium 82 is arranged in corrugated fashion and is held in that configuration by means of a mesh wire support 83 to which carbon-bonded filter medium 82 is bonded. A thin piece of non-woven fabric 84 extends across the top opening of box 81. A foam gasket 85 around the perimeter of the bottom of box 81 serves to seal final filter 80 against HEPA filter 70.

The foregoing filters and blower assembly are arranged in cabinet 100 in the order indicated (FIG. 2). Cabinet 100 is made of wood particle board or other construction material and comprises a top wall 101, a bottom wall 102, spaced sidewalls 103 and a short, upwardly projecting front wall 104. A central divider wall 105 separates the front compartment of cabinet 100 from the back compartment.

The open back of cabinet 100 is closed by a molded plastic back panel 110 which includes a locator flange 111 along the bottom and side edges thereof to seat against the interior of cabinet 100. Suitable fastening holes are provided whereby screws can be threaded into cabinet 100 to hold back panel 110 in place.

Figure 8:
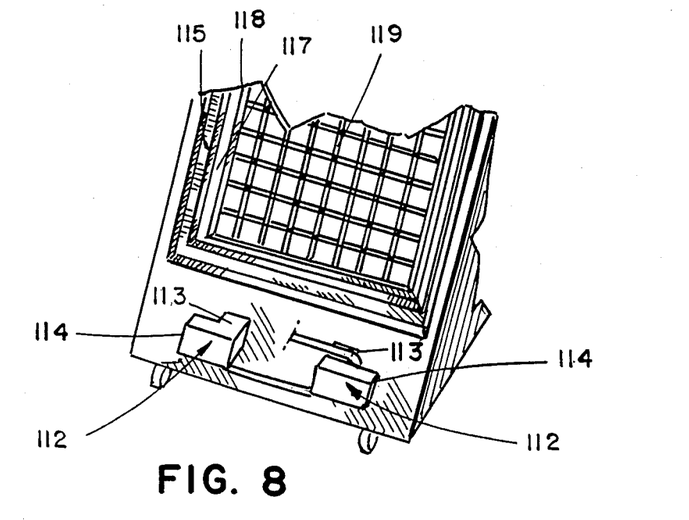
FIG. 8 is a broken, perspective view of the rear of the air treatment system.

Back panel 110 includes integrally molded cord wrap/standoffs 112, each including a projecting base portion 113 and a laterally projection wing 114 (FIGS. 2 and 8). The electric cord 125 for the unit can be wrapped around standoff bases 113, behind projection wings 114. Standoff/cord wraps 112 project rearwardly from back panel 110 approximately two inches. They prevent air treatment system 1 from being pushed so tightly against a wall as to restrict air flow into the unit.

Back panel 110 includes a large central opening covered by an integrally molded grill 119 and framed by three successive stepped, recessed ledges 115, 117 and 118 (FIGS. 2 and 8). Each of the ledges is generally rectangular in configuration. First recessed ledge 115 is recessed a distance sufficient to approximately accommodate the thickness of prefilter 10 and is faced along its top and bottom surfaces by a piece of fabric tape having a plurality of projections which hook into the loops of the end securing strips 12 on prefilter 10 (see FIG. 2). In this manner, prefilter 10 is held in place and stretched across the opening defined by first recessed ledge 115.

Second recessed ledge 117 defines a slightly smaller opening than first recessed ledge 115 and is recessed inwardly from recessed ledge 115 a distance sufficient to accommodate the thickness of first carbon filter 20. The foam gasket 26 on first carbon filter 20 seats snugly against second recessed ledge 117.

Third recessed ledge 118 defines a still smaller opening and is spaced further inwardly from recessed ledge 117 a distance sufficient to accommodate second carbon filter 30. Foam gasket 38 of second carbon filter 30 seats against recessed ledge 118. Each of the carbon filters 20 and 30 seats snugly within the recesses defined by recessed ledges 117 and 118, and is held in place by prefilter 10 being secured along its top and bottom securing end strips 12 engaging the mating securing strips 116 on first recessed ledge 115.

Blower assembly 40 is mounted on bottom wall 102 in the rear compartment of cabinet 100 in the manner previously described. Blower outlets 65 are securely fitted within openings at the bottom of central divider wall 105 so that air is drawn from the rear compartment of cabinet 100 and blown into the front compartment.

Air leaving blower assembly 40 is blown into plenum 120 which is molded of plastic and is located in the bottom of the front compartment of cabinet 100. Plenum 120 comprises an inlet 121 which receives air from blower assembly 40 and an outlet 122 defined by a perimeter lip 123 upon which is seated the foam gasket 75 of HEPA filter 70 (FIG. 2). Final filter 80 seats on top of HEPA filter 70 as heretofore described and both final filter 80 and HEPA filter 70 are held in place by the combination of a hold down frame 90 and a hold down bale 130 described below (FIG. 2). Positioned above final filter 80 is baffle 140, which is molded of plastic and includes a curved back wall 142 which extends between spaced sidewalls 141 (FIG. 2). Depending downwardly from each sidewall 141 is a reinforcing rib 143 including an opening 144 in the front end thereof. Opening 144 facilitates removably mounting a front panel 160 on air treatment system 1 in the manner described below. A front louver 150 is pivotally mounted at the front of baffle 140 and comprises the point at which air exits air treatment system 1.

Hold down frame 90 comprises a vertical perimeter wall 91 with an inwardly projecting, horizontal perimeter flange 92 (FIG. 1). Vertical wall 91 seats over box 81 of final filter 80 and horizontal flange 92 rests on top thereof. A pair of ribs 93 extend across frame 90, each including notches 94 in the top edge thereof. Hold down bale 130 is a generally U-shaped member pivotally mounted at each end in the sidewalls 141 of upper baffle 140. When bale 130 is pivoted downwardly, its bite portion slides into and engages the notches 94 in ribs 93 of hold down frame 90 to thereby secure final filter 80 and HEPA filter 70 in position.

A front panel 160 made of wood particle board, and preferably covered with fabric or the like, is removably mounted over the opening which contains HEPA filter 70 and final filter 80. Front panel 160 includes a compressible fastener 161 at each corner. The bottom compressible fasteners 161 fit into a hole 104A in front wall 104 of cabinet 100. The top compressible fasteners 161 fit into holes 144 in the downwardly depending ribs 143 on baffle 140. Each compressible fastener 161 comprises a post with a pair of wings projecting from the sides thereof in a ball configuration which can be forced into the respective openings 104A and 144 and which thereby snugly retain front panel 160 in position.

Located above baffle 140 is the control panel 170. Electric cord 125 provides power in. Wiring 171 leading away from control panel 170 provides power to blower assembly 40 and wiring 171A feeds power to an electrical outlet 172 located at the top of rear panel 110. Quick release connector means 173 connects wiring 171A to outlet 172. In a similar manner, quick release connectors 174 facilitate disconnection of wiring 171. A similar quick disconnect connector 175 is located at blower assembly 40. By removing back panel 110 and disconnecting connector 175, blower assembly 40 can be readily removed for repair or replacement simply by unscrewing the six screws in isolation mount grommets 50.

Another quick disconnector 176 facilitates disconnection of the main power cord 125 from control panel 170. Quick disconnect connector 177 also facilitates rapid disconnection of wiring from control panel 170. Through the use of quick disconnect connectors 176 and 177, one can readily disassemble control panel 170 from cabinet 100 by simply removing the two screws which hold it in place and disconnecting quick disconnect connectors 176 and 177.

Figure 9:
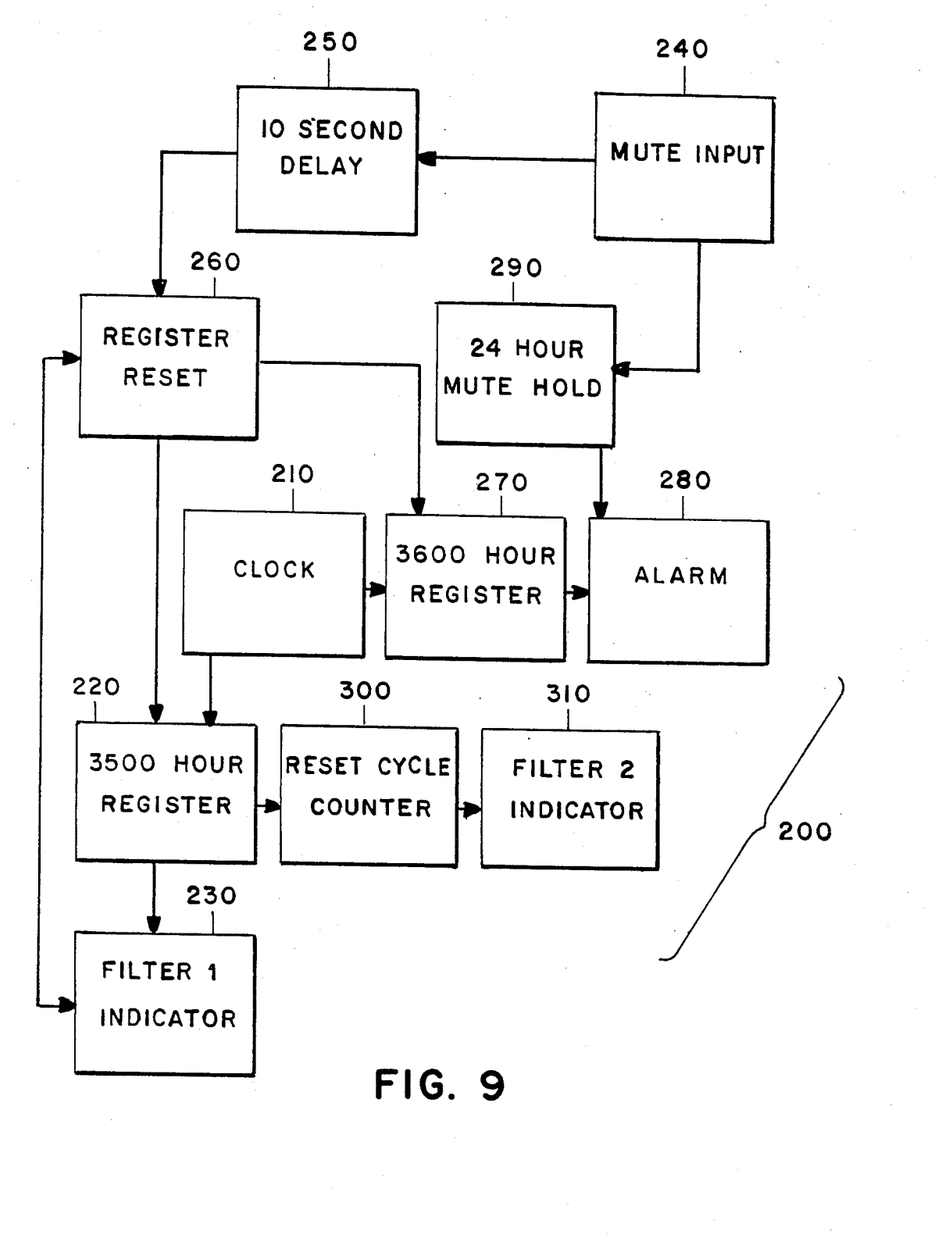
FIG. 9 is a functional schematic diagram of the filter change warning system of the air treatment system.

A unique feature of the control system of the air treatment system of the present invention comprises the filter change warning system 200 shown functionally schematically in FIG. 9. A clock module 210 drives a 3500 hour register 220 which upon expiration of 3500 hours activates filter 1 warning indicator 230. Filter 1 warning indicator 230 comprises a readout on control panel 170. When it lights up, the user knows that carbon filters 20 and 30 should be discarded and replaced.

Upon doing so, the user can recycle the 3500 hour register 220 by depressing the mute input button 240 for 10 seconds. This overrides a 10 second delay circuit 250 and activates the register reset function 260. It will be noted that register reset function 260 requires input not only from depression of the mute input button for more than 10 seconds, but also from the filter 1 indicator circuit. If filter 1 indicator 230 is not energized, depression of mute input button 240 for more than 10 seconds will not activate register reset 260.

In the event the user fails to change the filters and effect reset at 3500 hours, clock 210 will eventually activate 3600 hour register 270 which in turn will set off another indicator, alarm 280. Alarm 280 is preferably an intermittently beeping device, preferably beeping every 30 seconds. If alarm 280 goes off at an undesirable time, the user can deactivate it by momentarily depressing mute input 240. This activates 24 hour mute hold circuit 290 which in turn deactivates alarm 280 for 24 hours. After 24 hours, alarm 280 is again automatically energized. It will be noted that when mute input button 240 is depressed for more than 10 seconds so as to override 10 second delay circuit 250 and activate register reset 260, 3600 hour register 270 is reset along with 3500 hour register 220, provided register reset 260 is receiving input from filter 1 indicator circuit 230.

Warning system 200 also includes means for indicating the need to change HEPA filter 70 and final filter 80. Reset cycle counter 300 counts the odd and even numbered times 3500 hour register 220 is recycled. On even numbered counts, reset cycle counter 300 energizes filter 2 indicator circuit 310. Thus, each even numbered time that filter 1 indicator is energized, i.e., approximately every 7000 hours, filter 2 indicator 310 is also energized. Thus, at approximately 7000 hour intervals, the user is warned that he or she must replace not only carbon filters 20 and 30, but also HEPA filter 70 and final filter 80.

The foregoing functions or circuits are programmed or hard wired into a microcomputer mounted on control panel 170, which in turn is connected to the associated mute input button and filter change indicators. Power is provided through the 120 volt power input cord 125, and also preferably through a battery in the event of power failure. The presence of the battery prevents system reset in the event of power failure.

The preferred embodiment air treatment system is relatively quiet and extremely efficient. Even at high speed flow rates of 150 cubic feet per minute, air treatment system 1 of the present invention generates only about 51 decibels at 1 meter in front of the unit. Typical percentage particle removal for particles even as small as 0.100 micron is in excess of 96%. Typical percentage particle removal for particles larger than 1 micron is about 99%.

Of course, it is understood that the foregoing is merely a preferred embodiment of the invention and that various changes and alterations can be made without departing from the spirit and broader aspects thereof.

The embodiments of the invention is which an exclusive property or privilege is claimed are defined as follows.

1. A room air treatment system comprising:
   a cabinet having an air inlet and an air outlet;
   a large particle prefilter located generally at said inlet;
   carbon filter means located in said cabinet downstream from said prefilter for absorbing odorous and other chemical gases;
   blower means located in said cabinet downstream from said carbon filter means for drawing air through said prefilter and said carbon filter means;
   fine particle filter means located in said cabinet downstream from said blower means in air flow communication therewith whereby said blower means forces air through said fine particle filter means; and
   a final filter comprising a combination carbon filter and fine particle filter whereby odorous and other chemical gases and particles passing through or escaping earlier entrapment in said fine particle filter means are entrapped by said final filter.

2. The air treatment system of claim 1 in which said carbon filter means comprises at least two separate layers of carbon of different types, whereby different types of contaminants are attracted differentially to said two carbon layers.

3. The air treatment system of claim 2 in which said two carbon layers are arranged serially as an upstream layer and a downstream layer, said downstream layer of carbon being more preferentially attractive to specific contaminants than said upstream layer of carbon, whereby a broader range of contaminants will be absorbed by said upstream carbon layer and will thereby not contaminate said downstream carbon layer and interfere with its preferential absorption of said specific contaminants.

4. The air treatment system of claim 3 in which said upstream layer of carbon comprises a combination of activated carbon and activated carbon impregnated with an aldehyde attracting composition;
   said downstream layer comprising a blend of activated carbon treated with an acid attracting substance and activated carbon treated with a base attracting substance.

5. The air treatment system of claim 4 in which said carbon filter means comprises first and second adjacent honeycomb support matrices, each comprising a plurality of cells;
   carbon particles of said upstream carbon layer being contained in said cells in the upstream one of said honeycomb support matrices and carbon particles of said downstream carbon layer being contained in the downstream one of said honeycomb support matrices;
   said cells in said first honeycomb matrix being offset from said cells in said second honeycomb matrix whereby air passing over carbon particles settled in a cell in one of said honeycomb matrices will pass through the carbon in an adjacent but offset cell in the other of said honeycomb matrices.

6. The air treatment system of claim 1 in which said carbon filter means comprises two separate filters, the first comprising a honeycomb support matrix including a plurality of cells, each containing activated carbon particles;
   said second filter comprising first and second adjacent honeycomb support matrices, each comprising a plurality of cells containing activated carbon particles;
   said first filter containing a first type of activated carbon, said first honeycomb support matrix of said second filter containing a second type of activated carbon and said second honeycomb support matrix of said second filter containing yet a third type of activated carbon.

7. The air treatment system of claim 6 in which said first type of activated carbon in said first filter comprises a blend of approximately 50% by weight activated carbon and 50% by weight activated carbon impregnated with a material attractive to aldehydes;
   said second type of activated carbon comprising a blend of approximately 60% by weight activated carbon and 40% by weight activated carbon impregnated with a material attractive to aldehydes;
   said third type of activated carbon comprising a blend of approximately 20% by weight activated carbon, 40% by weight activated carbon impregnated with a base attractant material and 40% by weight activated carbon impregnated with an acid attractant material.

8. The air treatment system of claim 7 in which said cells in said first honeycomb support matrix of said second filter are offset from said cells in said second honeycomb matrix of said second filter whereby air passing over carbon particles settled in a cell in one of said matrices will pass through the carbon in an adjacent but offset cell in the other of said honeycomb matrices.

9. The air treatment system of claim 6 in which said air inlet of said air treatment system is framed by at least two stepped, recessed ledges, recessed inwardly away from the exterior of said cabinet, the first of said ledges being recessed a distance approximately equal to the thickness of said first carbon filter, said first carbon filter being seated against said first ledge;
   said second recessed ledge being recessed from said first ledge a distance approximately equal to the thickness of said second carbon filter and being stepped inwardly to narrow said inlet opening relative to said first ledge, said second carbon filter being smaller in perimeter dimensions than said first carbon filter and being seated on said second ledge.

10. The air treatment system of claim 9 in which each of said first and second carbon filters includes a foam gasket perimeter seal which seats against its respective one of said first and second ledges.

11. The air treatment system of claim 10 in which said first type of activated carbon in said first filter comprises a blend of approximately 50% by weight activated carbon and 50% by weight activated carbon impregnated with a material attractive to aldehydes;
   said second type of activated carbon comprising a blend of approximately 60% by weight activated carbon and 40% by weight activated carbon impregnated with a material attractive to aldehydes;
   said third type of activated carbon comprising a blend of approximately 20% by weight activated carbon, 40% by weight activated carbon impregnated with a base attractant material and 40% by weight activated carbon impregnated with an acid attractant material.

12. The air treatment system of claim 11 in which said cells in said first honeycomb support matrix of said second filter are offset from said cells in said second honeycomb matrix of said second filter whereby air passing over carbon particles settled in a cell in one of said matrices will pass through the carbon in an adjacent but offset cell in the other of said honeycomb matrices.

13. The air treatment system of claim 1 in which said carbon filter means comprises at least two separate carbon filters, one containing a first type of carbon and the other containing a different type of carbon whereby different types of contaminants are differentially attracted to said different types of carbon.

14. The air treatment system of claim 13 in which said air inlet of said air treatment system is framed by at least two stepped, recessed ledges, recessed inwardly away from the exterior of said cabinet, the first of said ledges being recessed a distance approximately equal to the thickness of said first carbon filter, said first carbon filter being seated against said first ledge;

said second recessed ledge being recessed from said first ledge a distance approximately equal to the thickness of said second carbon filter and being stepped inwardly to narrow said inlet opening relative to said first ledge, said second carbon filter being smaller in perimeter dimensions than said first carbon filter and being seated on said second ledge.

15. The air treatment system of claim 14 in which each of said first and second carbon filters includes a foam gasket perimeter seal which seats against its respective one of said first and second ledges.

16. The air treatment system of claim 13 in which said inlet opening is defined by first, second and third stepped, recessed ledges, each being recessed further towards the inside of said cabinet and each being stepped inwardly to successively narrow the dimensions of said inlet opening as one proceeds from said first ledge to said third ledge;

said first ledge being recessed a distance approximately equal to the thickness of said prefilter, said prefilter including at least top and bottom connection means engaging mating connection means on said first ledge;

said second ledge being recessed from said first ledge a distance approximately equal to the thickness of said first carbon filter, said first carbon filter being seated on said second ledge;

said third ledge being recessed from said second ledge a distance approximately equal to the thickness of said second carbon filter, said second carbon filter being smaller in lateral and longitudinal dimensions than said first carbon filter whereby it seats on said third ledge.

17. The air treatment system of claim 16 in which said first and second carbon filters include foam gasket seals engaging and seating on said second and third ledges respectively to minimize air bypassing said first and second carbon filters.

18. The air treatment system of claim 17 in which said mating connection means on said prefilter and said first ledge comprise a fabric securing strip on one of said ledge and prefilter having a plurality of projecting loops and a fabric securing strip on the other thereof having a plurality of loop engaging projections whereby said prefilter can be readily attached to and removed from said air treatment system by engaging or disengaging said loops and loop engaging projections.

19. The air treatment system of claim 16 in which said mating connection means on said prefilter and said first ledge comprise a fabric securing strip on one of said ledge and prefilter having a plurality of projecting loops and a fabric securing strip on the other thereof having a plurality of loop engaging projections whereby said prefilter can be readily attached to and removed from said air treatment system by engaging or disengaging said loops and loop engaging projections.

20. The air treatment system of claim 1 in which said carbon filter means comprises first and second adjacent honeycomb support matrices, each comprising a plurality of cells containing carbon particles;

said cells in said first honeycomb matrix being offset from said cells in said second honeycomb matrix whereby air passing over carbon particles settled in a cell in one of said honeycomb matrices will pass through the carbon in an adjacent but offset cell in the other of said honeycomb matrices.

21. The air treatment system of claim 1 in which said carbon filter means is seated within said air inlet in said air treatment system and said prefilter means is seated over said air inlet, said prefilter means including connecting means cooperating with connecting means on said cabinet whereby said prefilter can be removably mounted on said cabinet, said prefilter holding said carbon filter means in position within said inlet opening when said prefilter is secured to said cabinet.

22. The air treatment system of claim 21 in which said mating connecting means on said cabinet and said prefilter comprise:

a fabric securing strip on one of said cabinet and prefilter having a plurality of projecting loops and a fabric securing strip on the other thereof having a plurality of loop engaging projections whereby said prefilter can be readily attached to and removed from said cabinet by engaging or disengaging said loops and loop engaging projections.

23. The air treatment system of claim 1 in which said blower means is secured to a plurality of vibration absorbing mounts, which in turn are secured to said cabinet and which maintain a separation between said cabinet and said blower means whereby transmission of vibrations from said blower means to said cabinet is minimized.

24. The air treatment system of claim 1 in which said cabinet is divided into a front compartment and a rear compartment, said air inlet opening into said rear compartment and said air outlet opening out of said front compartment;

said prefilter, said carbon filter means and said blower means being mounted in said rear compartment, said blower means located generally at the bottom of said rear compartment;

said blower means opening into and communicating with a plenum located in the bottom of said front compartment;

said fine filter means being positioned above said plenum and above the level of said blower means opening into said plenum whereby air exiting said blower means is forced to turn upwardly in said plenum before entering said fine particle filter.

25. The air treatment system of claim 24 in which said carbon filter means comprises at least two separate carbon filters, one containing a first type of carbon and the other containing a different type of carbon whereby different types of contaminants are differentially attracted to said different types of carbon.

26. The air treatment system of claim 25 in which said air inlet of said air treatment system is framed by at least two stepped, recessed ledges, recessed inwardly away from the exterior of said cabinet, the first of said ledges being recessed a distance approximately equal to the thickness of said first carbon filter, said first carbon filter being seated against said first ledge;

said second recessed ledge being recessed from said first ledge a distance approximately equal to the thickness of said second carbon filter and being stepped inwardly to narrow said inlet opening relative to said first ledge, said second carbon filter being smaller in perimeter dimensions than said first carbon filter and being seated on said second ledge.

27. The air treatment system of claim 26 in which each of said first and second carbon filters includes a foam gasket perimeter seal which seats against its respective one of said first and second ledges.

28. The air treatment system of claim 25 in which said inlet opening is defined by first, second and third stepped, recessed ledges, each being recessed further towards the inside of said cabinet and each being stepped inwardly to successively narrow the dimensions of said air inlet opening as one proceeds from said first ledge to said third ledge;

said first ledge being recessed a distance approximately equal to the thickness of said prefilter, said prefilter including at least top and bottom connection means engaging mating connection means on said first ledge;

said second ledge being recessed from said first ledge a distance approximately equal to the thickness of said first carbon filter, said first carbon filter being seated on said second ledge;

said third ledge being recessed from said second ledge a distance approximately equal to the thickness of said second carbon filter, said second carbon filter being smaller in lateral and longitudinal dimensions than said first carbon filter whereby it seats on said third ledge.

29. The air treatment system of claim 28 in which said first and second carbon filters include foam gasket seals engaging and seating on said second and third ledges respectively to minimize air bypassing said first and second carbon filters.

30. The air treatment system of claim 29 in which said mating connection means on said prefilter and said first ledge comprise a fabric securing strip on one of said ledge and prefilter having a plurality of projecting loops and a fabric securing strip on the other thereof having a plurality of loop engaging projections whereby said prefilter can be readily attached to and removed from said air treatment system by engaging or disengaging said loops and loop engaging projections.

31. The air treatment system of claim 28 in which said mating connection means on said prefilter and said first ledge comprise a fabric securing strip on one of said ledge and prefilter having a plurality of projecting loops and a fabric securing strip on the other thereof having a plurality of loop engaging projections whereby said prefilter can be readily attached to and removed from said air treatment system by engaging or disengaging said loops and loop engaging projections.

32. The air treatment system of claim 28 in which said blower means is secured to a plurality of vibration absorbing mounts, which in turn are secured to said cabinet and which maintain a separation between said cabinet and said blower means whereby transmission of vibrations from said blower means to said cabinet is minimized.

33. The air treatment system of claim 24 in which said blower means is secured to a plurality of vibration absorbing mounts, which in turn are secured to said cabinet and which maintain a separation between said cabinet and said blower means whereby transmission of vibrations from said blower means to said cabinet is minimized.

34. A room air treatment system comprising:
a cabinet;
air filter means;
blower means, said blower means being mounted in said cabinet through vibration absorbing isolation mounts, said blower means being secured to said mounts and said mounts engaging said cabinet but holding said blower means spaced from said cabinet whereby vibration generated by said blower means tend to be absorbed by said mounts rather than transmitted to said cabinet;
said cabinet being divided into a front compartment and a rear compartment; said cabinet including an air inlet opening into said rear compartment and an air outlet opening out of said front compartment;
said air filter means including a large particle prefilter, and carbon filter means, located along with said blower means in said rear compartment, said blower means being located generally at the bottom of said rear compartment;
said blower means opening into and communicating with a plenum located in the bottom of said front compartment; and
said air filter means including a fine particle filter means positioned above said plenum whereby air exiting said blower means is forced to turn upwardly in said plenum before entering said fine particle filter means.

35. A room air treatment system comprising:
a cabinet including an air inlet and an air outlet;
carbon filter means seated within said air inlet and prefilter means located over said air inlet;
a fabric securing strip on one of said cabinet and prefilter having a plurality of projecting loops and a fabric securing strip on the other thereof having a plurality of loop engaging projections whereby said prefilter can be readily attached to and removed from said air treatment system by engaging or disengaging said loops and loop engaging projections, said prefilter holding said carbon filter means in position within said air inlet when said prefilter is secured to said cabinet.

* * * * *